Figure 1:
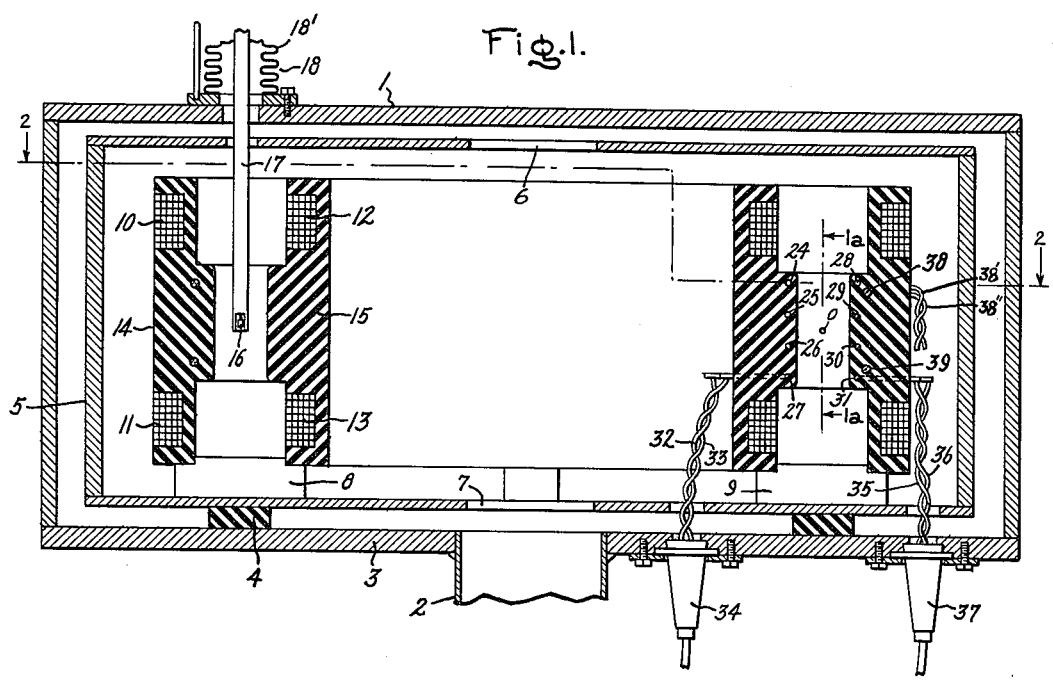

March 13, 1956     J. L. LAWSON     2,738,420

INJECTION INTO CHARGED PARTICLE ACCELERATORS

Filed Dec. 28, 1950     8 Sheets-Sheet 1

Inventor:
James L. Lawson,
by Paul A. Frank
His Attorney.

Inventor:
James L. Lawson,
by Paul A. Frank
His Attorney.

March 13, 1956  J. L. LAWSON  2,738,420
INJECTION INTO CHARGED PARTICLE ACCELERATORS
Filed Dec. 28, 1950  8 Sheets-Sheet 3
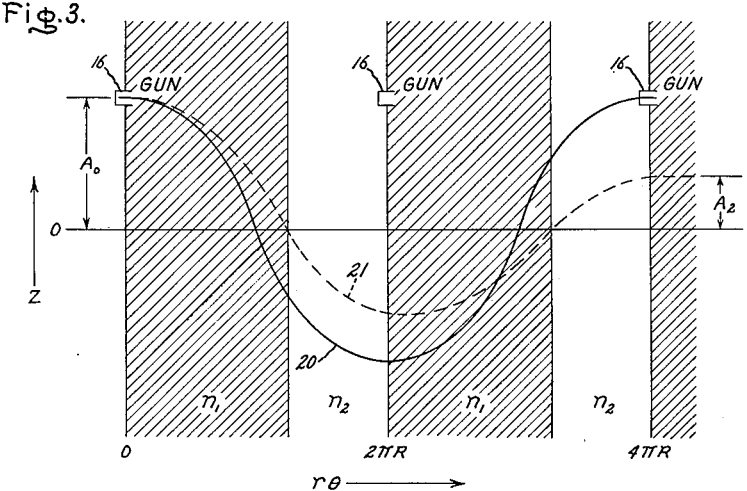
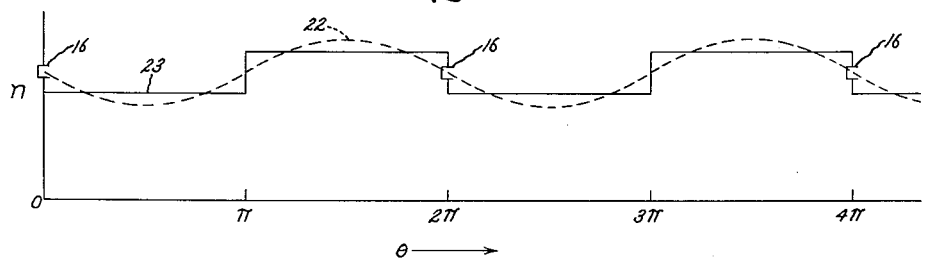
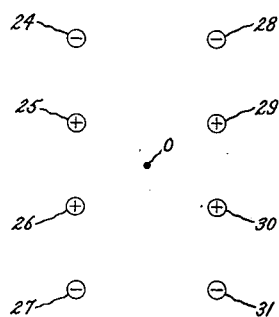
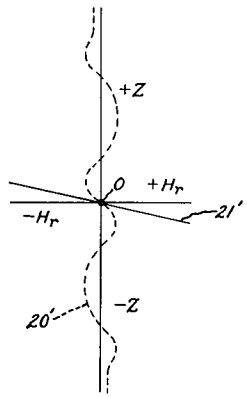
Inventor:
James L. Lawson,
by Paul A. Frank
His Attorney.

March 13, 1956  J. L. LAWSON  2,738,420
INJECTION INTO CHARGED PARTICLE ACCELERATORS
Filed Dec. 28, 1950  8 Sheets-Sheet 4

Inventor:
James L. Lawson,
by Paul A. Frank
His Attorney.

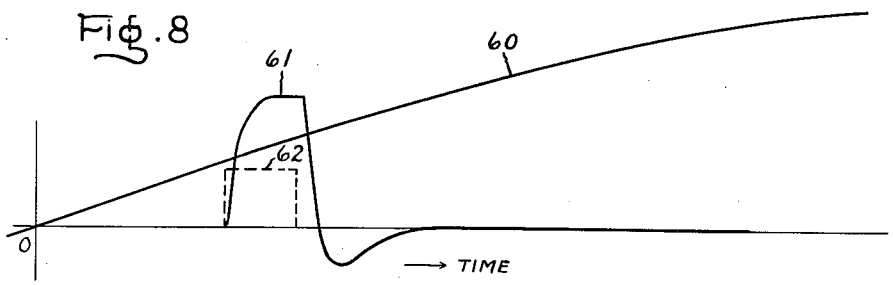
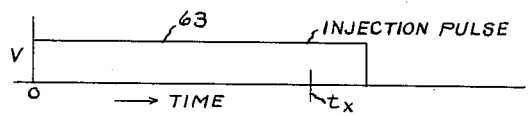
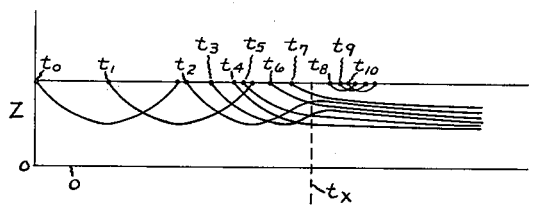
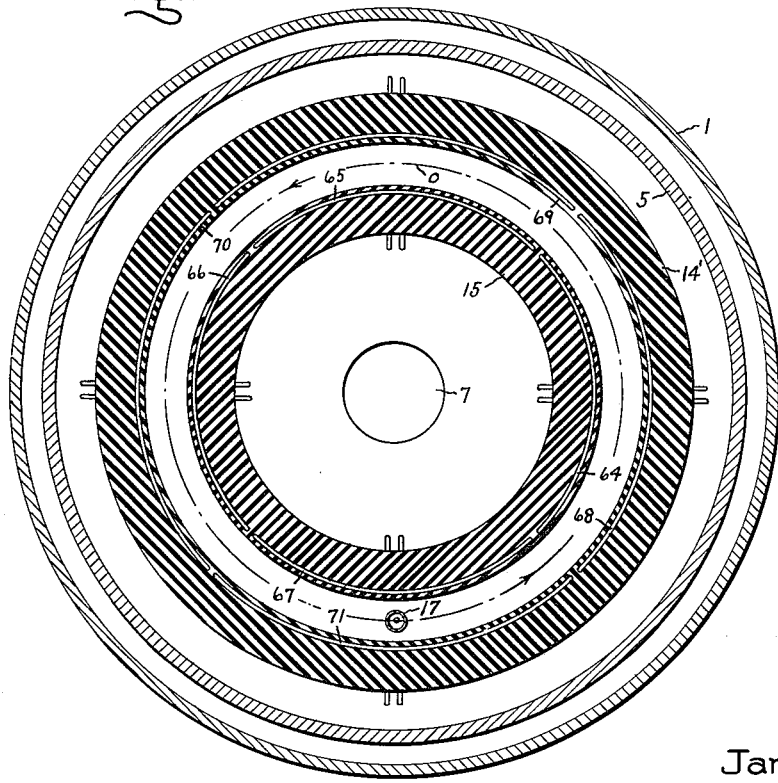
Inventor
James L. Lawson
by Paul A. Frank
His Attorney March 13, 1956  J. L. LAWSON  2,738,420
INJECTION INTO CHARGED PARTICLE ACCELERATORS
Filed Dec. 28, 1950 8 Sheets-Sheet 7

Inventor:
James L. Lawson,
by Paul A. Frank
His Attorney.

March 13, 1956  J. L. LAWSON  2,738,420
INJECTION INTO CHARGED PARTICLE ACCELERATORS
Filed Dec. 28, 1950  8 Sheets-Sheet 8

Inventor:
James L. Lawson,
by Paul A. Frank
His Attorney.

United States Patent Office 2,738,420
Patented Mar. 13, 1956

2,738,420

INJECTION INTO CHARGED PARTICLE ACCELERATORS

James L. Lawson, Schenectady, N. Y., assignor to General Electric Company, a corporation of New York Application December 28, 1950, Serial No. 203,149

9 Claims. (Cl. 250—27)

This invention relates to injection into charged particle accelerators and particularly to injection into charged particle accelerators which utilize magnetic induction effects.

It is now well known that energy of the order of several million electron volts or higher may be imparted to charged particles such as electrons by accelerating the particles along a generally circular equilibrium orbit with magnetic induction effects. For example, an apparatus for producing this result is disclosed in U. S. Patent 2,394,071, granted February 5, 1946, to Willem F. Westendorp and assigned to the assignee of the present invention. Such apparatus is commonly referred to in the art as a betatron and comprises field generating means for providing a time-varying magnetic flux which links the orbit to accelerate the particles and a time-varying magnetic guide field which traverses the orbital region for constraining the particles thereto.

In this apparatus charged particles are usually injected for a desired time interval, beginning early in the cycle of the time-varying magnetic flux and field, from a source such as an electron gun suitably positioned adjacent the equilibrium orbit and within the region traversed by the time-varying magnetic field. After injection, each electron repeatedly circulates along the orbit, gaining upon each turn an amount of energy in electron volts equal to the instantaneous voltage which would be induced by the time-varying magnetic flux in a single turn of wire placed at the orbit position. The circulation by each electron along the orbit continues during a portion of the cycle of the time-varying magnetic flux and field whereby a group of electrons is accelerated once per cycle to produce a pulsating output.

While betatron apparatus, and other forms of similar apparatus employing the betatron principle of operation at least in part, have been outstandingly successful in accelerating electrons to high energy levels, considerable difficulty has been encountered in obtaining good injection efficiency, i. e. ratio of the number of electrons accelerated to the desired ultimate energy level to the number of electrons injected from the electron gun. The reason for this becomes evident when it is realized that the electrons do not have precisely circular trajectories along the orbit during acceleration. Instead, the electrons undergo radial and vertical oscillations as they travel along the orbit whereby many of them after injection return to hit the gun structure following one or more revolutions. Therefore, a principal object of the present invention is to provide effective methods and means for improving substantially the injection efficiency of accelerator apparatus which utilize magnetic induction effects.

In accordance with one aspect of the invention more fully described and delineated hereinafter, injected particles are prevented from striking the injector structure after a few revolutions by the expedient of damping the amplitude of their oscillation within the orbital region. The damping force is created by a time-dependent azimuthal inhomogeneity in the orbital region traversed by the time-varying magnetic field.

Figure 1A:
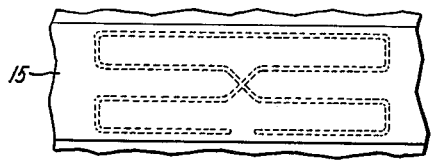
Figure 2:
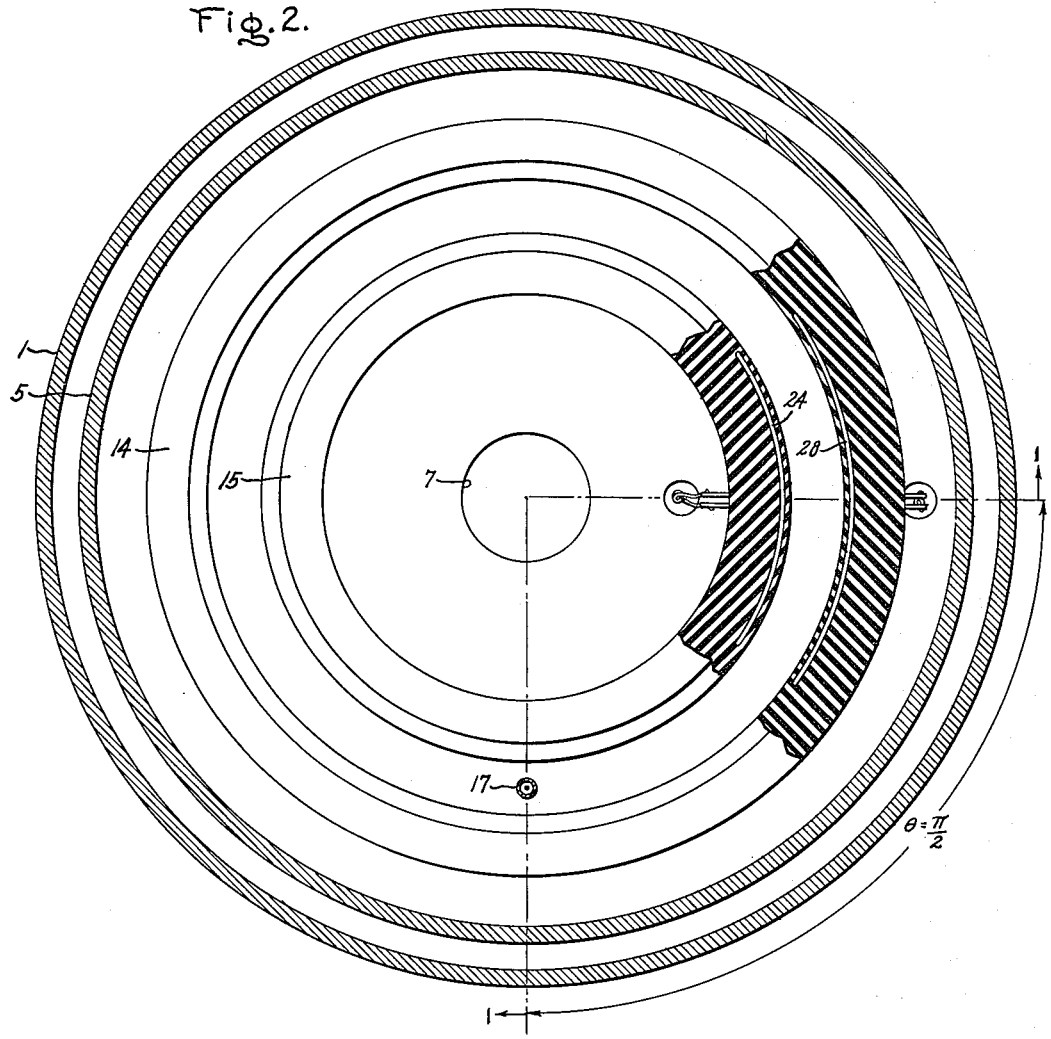
Figure 6:
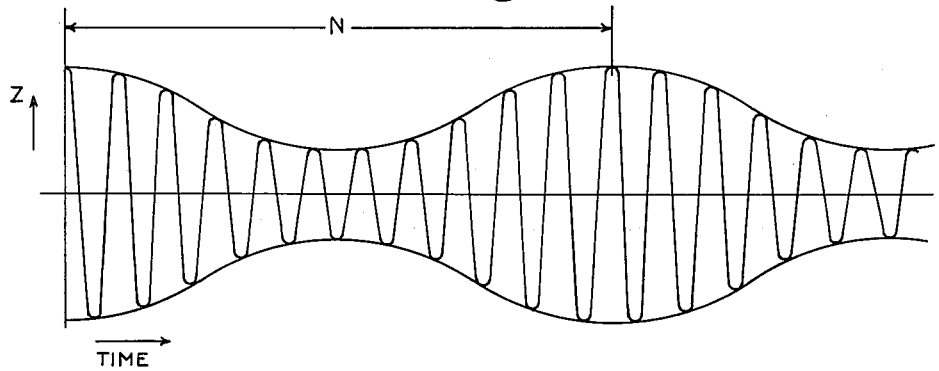
Figure 7:
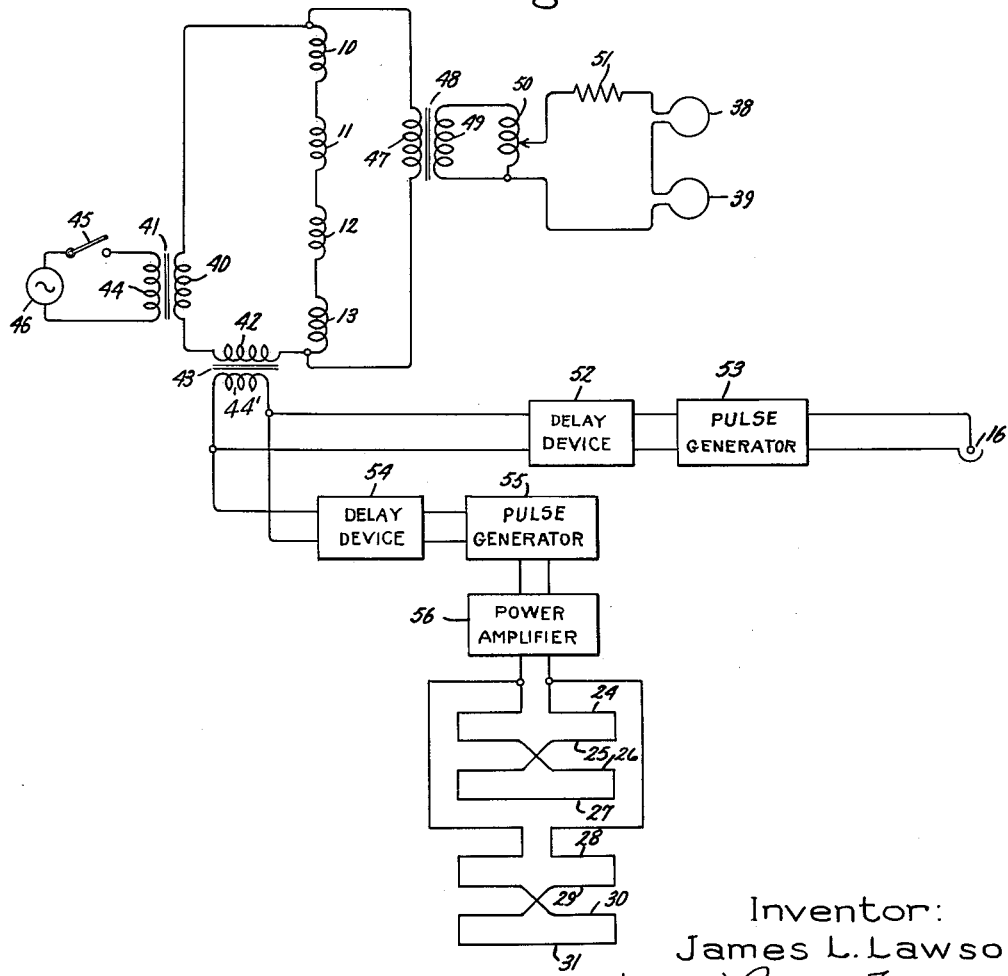
Figure 12:
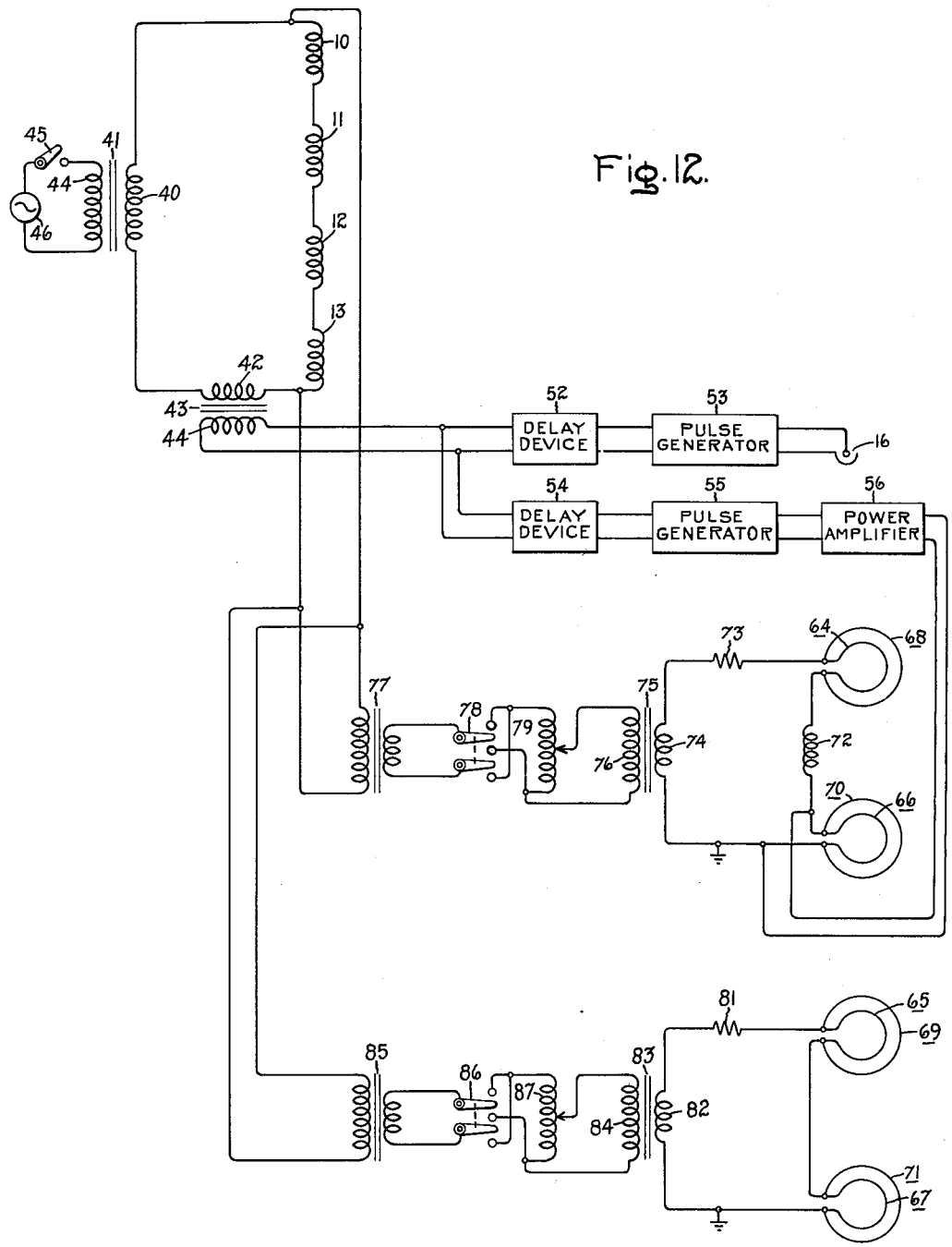
Figure 21:
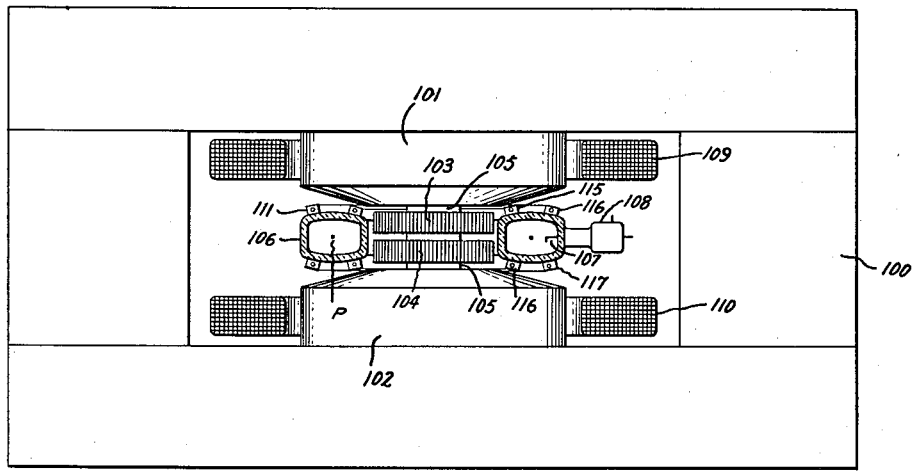
Figure 22:
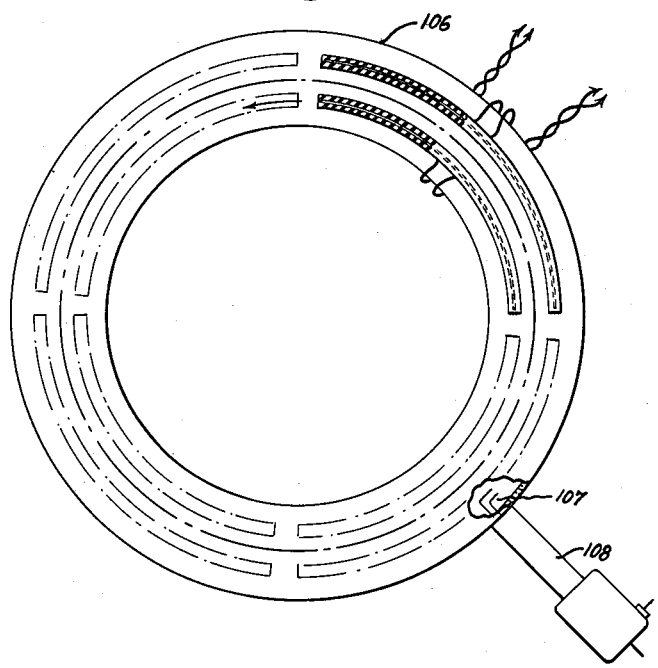

The features of the invention desired to be protected herein are pointed out with particularity in the appended claims. The invention itself, together with further objects and advantages thereof, may best be understood by reference to the following description taken in connection with the accompanying drawings in which Fig. 1 is a partially sectionalized view of simplified accelerator apparatus suitably embodying the invention, the view being taken along line 1—1 of Fig. 2; Fig. 1a is a partial view taken along line 1a—1a of Fig. 1; Fig. 2 is a section view taken along line 2—2 of Fig. 1; Figs. 3, 4, 5, 5a and 6 are diagrammatic illustrations useful in explaining the invention; Fig. 7 is a simplified circuit diagram indicating sutable connections for the various circuit elements shown in Fig. 1; Figs. 8, 9 and 10 are further diagrammatic illustrations useful in explaining the invention; Fig. 11 is a section view showing an alternative embodiment of the invention; Fig. 12 illustrates simplified circuit connections useful in connection with the embodiment of Fig. 11; Figs. 13, 14, 15, 16, 18, 19 and 20 are simplified diagrammatic illustrations of alternative conductor and electrostatic plate configurations for obtaining an azimuthal field inhomogeneity according to the invention; Fig. 21 is a partially sectionalized front elevation of iron-core accelerator apparatus suitably embodying the invention; and Fig. 22 presents an enlarged view of the annular envelope in the apparatus of Fig. 21.

As has been stated hereinbefore, the present invention relates to apparatus which utilize magnetic induction effects, at least in part, for acceleration of charged particles such as electrons along a generally circular equilibrium orbit. In Figs. 1, 1a and 2, there is shown in simplified fashion non-ferromagnetic accelerator apparatus in which the present invention may be suitably incorporated. The apparatus comprises an air-tight tank 1 which may be evacuated through a suitable connection 2 attached to base plate 3 of tank 1. Supported from base plate 3 by means of a circular dielectric spacer member 4 is a hollow cylindrical liner 5 having openings 6 and 7 in the top and bottom thereof, respectively, to permit internal evacuation through connection 2 which may be connected to a suitable vacuum pump (not shown). Tank 1 preferably consists of ferromagnetic material such as iron or steel, while liner 5 preferably consists of non-ferromagnetic material such as copper for the purpose of providing proper shielding for the magnetic fluxes and fields generated within the accelerator apparatus during operation thereof. Supported within liner 5 by means of a plurality of arcuate dielectric spacer members illustrated by members 8 and 9 are a pair of generally circular outer windings 10 and 11 and a pair of generally circular inner windings 12 and 13, both pairs of outer and inner windings being suitably encased, respectively, within arcuate dielectric coil forms 14 and 15. Coil forms 14 and 15 should be supported radially to prevent displacement by the forces exerted thereupon when windings 10—13 are energized; however, the illustration of such supports has been omitted for the purpose of simplifying the drawing. Structural details of suitable means for providing adequate support for coil forms 14 and 15 are disclosed in copending application Serial No. 196,482 of James L. Lawson, Howard R. Kratz and George L. Ragan, now U. S. Patent No. 2,622,194, filed November 18, 1950, and assigned to the assignee of the present invention. For a similar reason, means for energizing windings 10—13 from an external source of time-varying voltage (not shown) have been omitted from Fig. 1 but suitable means for accomplishing this purpose are also disclosed in the aforementioned application. An electron gun 16 insulatingly supported within a non-ferromagnetic tubular member 17 of a material such as brass or copper is adjustably positioned from a conventional hermetic sealing member 18 attached to the exterior of tank 1 and comprising a Sylphon bellows 18'. Structural details of an electron gun which may be advantageously employed in connection with the present invention are disclosed and claimed in U. S. Patent 2,499,192, granted February 28, 1950, to James M. Lafferty and assigned to the assignee of the present invention.

Figure 2A:
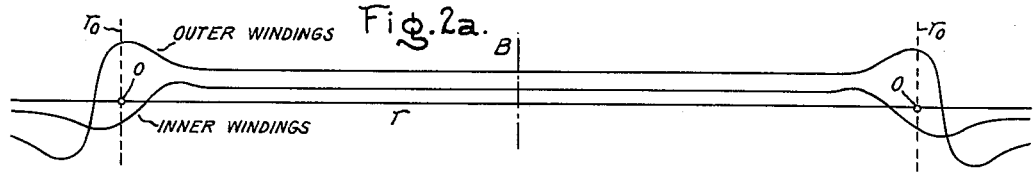
Figure 2B:
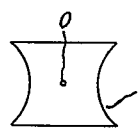

Assuming for the moment that successful injection of electrons from gun 16 may be obtained, it will now appear that, if betatron flux and field producing windings 10—13 are energized from a source of time-varying voltage in a manner to be more fully described hereinafter, acceleration of electrons along equilibrium orbit O may be secured, providing the well known betatron flux and field considerations are satisfied. The betatron relationships which must be met are as follows:

$$\Delta\phi = 2\pi r_0^2 B_0 \quad (1)$$

where $\Delta\phi$ is the total change in flux linking the orbit from the time at which the magnetic induction B is zero, $r_0$ is the radius of the equilibrium orbit, and $B_0$ is the magnetic induction at the equilibrium orbit;

$$H_z = H_0 \left(\frac{r}{r_0}\right)^{-n} \quad (2)$$

where $n$ is an exponent or index having a value between 0 and 1, $H_0$ is the magnetic field intensity at the equilibrium orbit, $H_z$ is the component of the magnetic field intensity in the axial direction (perpendicular to the radius and to the tangent of the equilibrium orbit) taken at a position under consideration, and $r$ is the radius of such a position. Equation 1 represents the flux-field condition which must be complied with to secure successful acceleration; Equation 2 represents a stability condition which must be fulfilled before the charged particles will be properly acted upon by vertical and radial restoring forces from the guide field and caused to execute stable oscillations in the vicinity of the equilibrium orbit. In order to satisfy Equation 1, which need be met only along equilibrium orbit O, with two windings outside and two windings inside equilibrium orbit O as shown, it is necessary to have the current flowing in all the windings in the same direction, whereupon the flux linking the orbit is then in the same direction from both inner and outer windings while the field traversing the orbital path from the inner windings is opposite that from the outer windings. With a proper ratio of the number of turns in the outer windings to the number of turns in the inner windings, Equation 1 can be fulfilled. Equation 2 requires a circumferentially or azimuthally uniform field which falls off in proportion to $1/r^n$ in the region adjacent equilibrium orbit O. In order to fulfill Equation 2, it is necessary to match the shape of the magnetic induction curves of inner windings 12 and 13 and outer windings 10 and 11 such that the net magnetic induction falls off at the proper rate with the radius in the orbital region. In Fig. 2a, curves of magnetic induction B in the plane of equilibrium orbit O vs. radius $r$ are shown for both inner windings 12 and 13 and outer windings 10 and 11. It will be observed from Fig. 2a that the desired falling off of magnetic induction with radius to give a value of $n$ falling between 0 and 1 may be obtained at or near the field maxima of both inner and outer windings. The most effective procedure for locating windings 10—13 is to employ various scale models of inner and outer windings whereby the magnetic induction may be measured in a manner well known to those skilled in the art with a magnetic pickup coil. By successive approximations, it is possible to arrive at a geometry which satisfies Equation 1 along equilibrium orbit O and also produces a satisfactory field variation in both radial and vertical directions over the desired stable region in the vicinity of equilibrium orbit O as required by Equation 2. With the above described winding configuration a stable region of considerable extent adjacent the equilibrium orbit may be obtained, the shape of such a region being indicated by the solid line representation of Fig. 2b.

As has been stated heretofore, however, electrons injected from gun 16 are not immediately captured and caused to rotate in curvilinear paths or trajectories along equilibrium orbit O. Instead the electrons undergo vertical and radial oscillations whereby they gyrate along equilibrium orbit O within the stable region traversed by the time-varying magnetic field defined by Equation 2. It may be shown that the vertical and radial oscillation frequencies are determined by the following relations:

$$\omega_z = \omega_0 \sqrt{n} \quad (3)$$

where $\omega_z$ is the vertical or axial angular velocity and $\omega_0$ is the rotational angular velocity $$\omega_r = \omega_0 \sqrt{1-n} \quad (4)$$

where $\omega_r$ is the angular velocity of the radial oscillations. From Equation 3 it may be seen that if $n=0.25$ and if vertical injection (injection from above or below the plane of the equilibrium orbit) is employed, a resonance condition between vertical and orbital oscillations will obtain and the electrons may be expected to return to their original amplitude at the injector or gun structure after they have made two revolutions, providing no damping has taken place in the meantime. Since gun 16 is illustrated in Fig. 1 as being positioned above the plane of equilibrium orbit O, Equation 3 will be utilized in the discussion hereinafter; but it will be understood that if radial injection is employed, Equation 4 may be utilized in a like manner.

From experimental tracing of the beam in apparatus such as that disclosed in Fig. 1, it has been found that electrons injected from gun 16 do follow the requirements of Equation 3 and return to their original amplitude to strike the rear of the injector or gun structure, providing the exponent or index $n$ in Equation 2 is substantially azimuthally uniform. That is to say, if there are no substantial circumferential variations of the index $n$, and $n$ remains essentially constant throughout the azimuthal extent of the stable region surrounding equilibrium orbit O, then injected electrons strike the gun structure after a few revolutions, the number depending upon the value of the index $n$. This result is schematically illustrated in Fig. 3 wherein the trajectory of an electron in the vertical or z direction is plotted against azimuthal position, $r\theta$. As will be apparent, Fig. 3 is a developed view and gun 16, which is the point of origination of the electrons, appears with respect to electron trajectory as indicated at the 0, $2\pi$, $4\pi$, etc. positions. If $n$ is uniform or $n(\theta)$ is a constant, the electron trajectory is as indicated by solid line 20, providing $n=0.25$. Thus, as required by Equation 3 when $n=0.25$, the electrons oscillate in a vertical direction about equilibrium orbit O and return to strike gun 16 after two revolutions.

According to the present invention, however, if a value of $n$ smaller than 0.25 is provided in the shaded region denoted $n_1$ and a value of $n$ larger than 0.25 provided in the unshaded region marked $n_2$ such that in each region one-quarter cycle of z or vertical oscillation occurs, the z oscillation amplitude changes monotonically or continuously decreases as illustrated by dotted curve 21. This is caused by the requirement that the first quarter cycle portion of the electron trajectory traced in the $n_1$ region must join in space and direction with the second quarter cycle portion of the electron trajectory traced in the $n_2$ region in order for stable acceleration to occur. This requirement shows that the amplitude of each of these one-quarter cycle oscillations indicated by dotted curve 21 is proportional to its wave length, which, since we are considering vertical oscillations, is inversely proportional to the $\sqrt{n}$. Thus the amplitude $A_2$ after two orbital turns in terms of the original amplitude $A_0$ is $$\frac{A_2}{A_0} = \frac{n_1}{n_2} \quad (5)$$

From Equation 5 it is evident that extremely rapid damping or undamping of the electron trajectories may be obtained by the appropriate choice of $n_1$ and $n_2$. With these considerations in mind, reference to Fig. 4 wherein $n$ is plotted as a function of angular position $\theta$, will make it apparent that the condition for damping requires that the first harmonic of $n(\theta)$ must have a minimum in the half orbital turn just following gun 16 and a corresponding maximum in the half turn just preceding gun 16, as represented by dotted curve 22 which may be considered as the first harmonic Fourier component of the $n(\theta)$ square wave 23. Therefore, the damping condition is most readily produced by providing a "bump" in $n$ at an azimuth of $\pm\pi/2$ from gun 16; the sign of the bump being properly chosen to produce damping.

The azimuthal bump in $n$, required as above explained to produce damping, may be provided according to the invention by properly varying with respect to azimuth the radial gradient of the magnetic field which traverses the orbital region, or by properly varying with respect to azimuth the vertical gradient of the magnetic field. In other words, the slope of the curve of the radial component $H_r$ of the magnetic field versus vertical or $z$ position, of which $n$ is a measure, may be properly varied with respect to azimuth to produce the $n$ bump; or the slope of the curve of the vertical component $H_z$ of the magnetic field versus radial or $r$ position, of which $n$ is also a measure, may be properly varied with respect to azimuth to produce the $n$ bump. These two types of variations are interrelated in a manner which will be understood from the following derivation.

From Maxwell's equations relating to a magnetic field which does not include any current flow therethrough, we have $$\text{curl } H = 0$$

or $$\frac{\partial H_r}{\partial z} - \frac{\partial H_z}{\partial r} = 0 \quad (6)$$

Differentiating Equation 2 partially with respect to $r$, we obtain $$\frac{\partial H_z}{\partial r} = -\frac{nH_z}{r} \quad (7)$$

Substituting Equation 7 in Equation 6, $$\frac{\partial H_r}{\partial z} = -\frac{nH_z}{r} \quad (8)$$

and integrating, the following relation results, $$H_r = -\frac{nz}{r} H_z \quad (9)$$

It may also be observed from Equation 6 that the rate of change of $H_r$ with respect to $z(\partial H_r/\partial z)$ and the rate of change of $H_z$ with respect to $r(\partial H_z/\partial r)$ are interdependent because their sum must always equal zero. Therefore, altering $\partial H_r/\partial z$ necessarily alters $\partial H_z/\partial r$ in the same direction. However, it may be shown by reference to the equations of motion of charged particles undergoing acceleration within the magnetic field traversing the orbital region that altering $\partial H_r/\partial z$ in one direction to provide a damping $n$ bump, whereby the vertical restoring force decreases the amplitude of vertical oscillation, produces an opposite effect in the net horizontal restoring force even though $\partial H_z/\partial r$ is altered in the same direction, and vice versa. Thus, altering $\partial H_z/\partial r$ to produce a damping $n$ bump for vertical oscillations automatically produces an undamping $n$ bump for horizontal oscillations, while altering $\partial H_r/\partial z$ to produce a damping $n$ bump for horizontal oscillations automatically produces an undamping $n$ bump for vertical oscillation, and vice versa.

Since we are, for purposes of illustration, considering suitable damping for vertical injection, i. e., when gun 16 is positioned in the vertical plane extending through equilibrium orbit O, any $n$ damping bump must be such that the slope of the curve of the radial component $H_r$ with respect to vertical or $z$ position is altered to cause the vertical restoring force to reduce the amplitude of the vertical oscillations. As stated above, this requires that the first harmonic of $n(\theta)$ have a minimum in the half orbital turn just following gun 16 and a corresponding maximum in the half orbital turn just preceding gun 16. With reference again to Figs. 1, 1a and 2, the desired first harmonic of $n(\theta)$ may be produced according to the invention with a plurality of conductors 24—31 supported by coil forms 14 and 15 within and without equilibrium orbit O as shown, each of the conductors 24—31 being substantially centered about the $\pi/2$ azimuthal position. Conductors 24—27 may be connected in series and energized from a suitable source of voltage (not shown) through a twisted pair of leads 32 and 33 which are hermetically sealed to tank 1 by means of an insulator 34. Conductors 28—31 may also be connected in series and energized through a twisted pair of leads 35 and 36 which are hermetically sealed within tank 1 by means of an insulator 37. When energized at the proper time and for the proper time interval, conductors 24—31 produce the desired damping $n$ bump in a manner which will be more fully described hereinafter. Conductors 38 and 39, which are circular in configuration and extend substantially entirely around the circumference of coil form 14, may be energized respectively through twisted pairs of leads to provide a desired average value of $n$ for a purpose which will later become evident. Twisted leads 38', 38'' are connected with conductor 38. Similar twisted leads, connected with conductor 39, are not visible in the drawing.

By reference to Figs. 5 and 5a, it will be readily understood how the conductors 24—31 produce the desired azimuthal $n$ damping bump. Assuming that conductors 24—31 are energized such that they respectively carry substantially equal currents having the directions conventionally indicated in Fig. 5, then the variation of the radial field component $H_r$ produced thereby in the vertical or $z$ direction is as indicated by dotted curve 20'. Thus, it will be observed that conductors 24—31 produce a vertical variation of the radial field component $H_r$ which is proportional to $z$ within the region surrounding equilibrium orbit O. However, in order to determine the resultant $n$ damping bump, the component of $H_r$ supplied by conductors 24—31 must be added to the component of $H_r$ supplied by betatron windings 10—13, such latter component being represented by solid curve 21'. As will be apparent, the addition of curves 20' and 21' results in an alteration of the slope of the curve of the radial component $H_r$ of the magnetic field versus vertical or $z$ position, i. e., the resultant $H_r$ component has a different slope than the slope of the curve 21'. Consequently, from the above discussion wherein it is shown that $n$ is a measure of the slope of the curve of $H_r$ versus $z$, it will be realized that conductors 24—31 vary the value of $n$ within the azimuthal extent of their influence. Since conductors 24—31 have only a limited azimuthal extent as indicated in Fig. 2, an $n$ bump is produced thereby. Moreover, since conductors 24—31 are positioned in the half orbital turn just following gun 16 and since the slope of curve 20' has a greater negative slope than curve 21' within the region adjacent equilibrium orbit O, the first harmonic of $n(\theta)$ has a minimum in the half orbital turn following gun 16, this being the desired damping condition. By positioning conductors 24—31 symmetrically about the $\pi/2$ azimuth immediately following gun 16 as shown in Fig. 2, the maximum effect may be obtained, i. e., the maximum amplitude of the first harmonic of $n(\theta)$ may be generated for a given conductor current.

From all the foregoing considerations it will be evident that the desired first harmonic of $n(\theta)$ may also be produced by positioning conductors 24—31 in the half orbital turn immediately preceding gun 16 and reversing all the directions of current flow whereby the desired maximum of the first harmonic of $n(\theta)$ appears in the half orbital turn immediately preceding gun 16. Or sets of conductors such as conductors 24—31 may be positioned in both half orbital turns to produce the desired damping condition. Moreover, if conductors 24—31 as shown in Figs. 1, 1a and 2 are rotated 90° as a set about equilibrium orbit O and the directions of current flow reversed in all the conductors, the slope of the curve of the vertical component $H_z$ of the magnetic field versus radial or $r$ position may be varied to produce the desired $n$ damping bump, such being made possible by the hereinbefore discussed interrelation of $$\frac{\partial H_z}{\partial r} \text{ and } \frac{\partial H_r}{\partial z}$$

In practice, damping by the above described creation of an azimuthal $n$ bump does not alone provide effective injection of electrons from gun 16. To be successful, it would require the practically impossible condition that the relative phase of the orbital and vertical oscillations of the electrons remain fixed in time. Actually, it is never feasible to adjust the variation of $n(\theta)$ so that the damping illustrated in Fig. 3 continues indefinitely. After a while an electron, instead of starting into a shaded $n_1$ region exactly at its extreme amplitude position, will start into an unshaded region $n_2$. In this event undamping will occur. In particular, the vertical oscillation amplitude will "beat" slowly at a rate which is the difference in frequency between the actual vertical oscillation frequency and the synchronous vertical oscillation frequency (one-half the orbital frequency if $n=0.25$ as may be seen from Equation 3). These considerations make two points evident; first, that large damping effects for a few turns of the electrons can be experienced even though the average value of $n$ is not very close to the synchronous value of 0.25, and second that (especially when $n$ is not very near 0.25) if damping as above described is employed to cause electrons to avoid the gun structure after two revolutions, undamping is certain to increase subsequently the vertical oscillation amplitude to a value higher than its initial value. This essentially guarantees that, if the electrons revolve more than two turns, they may not continue for very many more without striking the gun structure. The "beating" of the vertical oscillation amplitude is diagrammatically illustrated in Fig. 6 wherein the vertical oscillations are plotted against time. If N is defined as the number of vertical oscillations required to have the maximum "beat" amplitude slip in phase by one orbital turn (as indicated in Fig. 6) then the following equation may be employed to determine when undamping will occur:

$$N = \frac{1}{2 - \frac{1}{\sqrt{n}}}$$

According to the present invention, the subsequent undamping following initial damping is avoided by arranging for the $n$ bump to be time dependent, i. e. the $n$ bump is suddenly removed before the vertical oscillations can undamp beyond their initial amplitude whereby the injected electrons will not be intercepted by the gun structure. In order to clarify the manner in which damping is obtained according to the invention, reference may be had to Fig. 7 wherein elements shown and described hereinbefore are represented schematically and are identified by identical numerals. As shown, the betatron accelerating or energizing windings 10—13 are connected in series circuit with the secondary winding 40 of a transformer 41 and the secondary winding 42 of a peaking transformer 43. The primary winding 44 of transformer 41 is connected through a suitable switch or circuit breaker 45 to a source of time-varying voltage 46. Connected across betatron windings 10—13 is the primary winding 47 of a step-down transformer 48 having a secondary winding 49 connected to a variable output transformer 50. The coils 38 and 39, mentioned hereinbefore as being employed to provide a desired average value of $n$, are series connected to a resistor 51 across the output of variable output transformer 50. As will now become evident, when switch 45 is closed, betatron windings 10—13 are energized through transformer 41 from time-varying voltage source 46 whereby the resultant time-varying current creates a time-varying magnetic flux which links equilibrium orbit O and a time-varying magnetic field which traverses the orbital region as has been hereinbefore described. During each cycle of the betatron winding current, peaking transformer 43 delivers a voltage pulse from its secondary winding 44' to a delay device 52 which determines the time of energization of a pulse generator 53 having its output connected to electron gun 16. This same voltage pulse emanating from transformer 43 may be transmitted to a delay device 54 which determines the time of energization of a pulse generator 55 having its output connected through a power amplifier 56 to conductors 24—31. As will be observed, conductors 24—27 are connected in series to the output of power amplifier 56 and in parallel with series-connected conductors 28—31 whereby it is assured that the currents in all of the conductors are substantially equal and in the proper direction as previously specified. It will be understood that delay devices 52 and 54, pulse generators 53 and 55, and power amplifier 56 may comprise suitable circuits well known to those skilled in the art. Pulse generator 55 preferably comprises means for varying the amplitude and duration of the pulse generated thereby in order that the current through damping conductors 24—31 may be properly varied.

The sequence of events which occur in the operation of the circuit of Fig. 7 may be readily explained in connection with Fig. 8 wherein curve 60 represents a portion of the cycle of the current through betatron accelerating windings 10—13. Curve 61 represents the output of pulse generator 53 and hence the injection voltage applied to electron gun 16. Curve 62 represents the output of power amplifier 56 and hence the current pulse through conductors 24—27 and 28—31. As will be observed the injection pulse 61 is initiated early in the cycle of the betatron winding current whereby the electrons may be accelerated by the time-varying flux and field until a flux and field maximum is reached. At or shortly before the initiation of injection pulse 61, the current pulse 62 for producing an $n$ bump is initiated. It is to be specifically noted that current pulse 62 and the consequent $n$ bump terminate before injection pulse 61 terminates whereby undamping of the electron vertical oscillations is prevented as above explained.

Since electrons are injected from gun 16 for a finite time interval during the extent of injection pulse 61, it will appear that not all of the electrons emanating from gun 16 during injection will be successfully damped. This fact may be explained by reference to Figs. 9 and 10. Curve 63 of Fig. 9 represents, for the sake of simplicity, the injection pulse as a square wave beginning from zero time. The various curves of Fig. 10 represent the envelope of the amplitude of the vertical oscillations of various electrons emanating from gun 16 at the times $t_0$–$t_{10}$. From the foregoing, it will be seen that, if an $n$ bump is applied as hereinbefore described for the time interval from $t=0$ to $t=t_x$, the envelopes of the amplitude of the vertical oscillations of electrons injected during that period will be as shown. Accordingly, electrons originating during the time interval from $t=t_0$ to $t=t_2$ undamp and hence strike the gun structure. Similarly, any electrons emanating from gun 16 after $t=t_x$ undamp and strike the gun structure. However, electrons originating between the times $t=t_2$ and $t=t_x$ damp down as shown and are successfully accelerated along equilibrium orbit O. As may be observed, if the $n$ bump produced from pulse 62 is continued beyond $t=t_x$, all of the electrons, or at least a great proportion of them, will undamp and strike the gun structure before acceleration to the desired energy level can be obtained.

It may now be recalled that conductors 38 and 39 (Fig. 1) are employed to provide a desired average value of $n$. Since conductors 38 and 39 are essentially circular in configuration and extend substantially entirely around the circumference of coil form 14, energization thereof from the voltage across betatron windings 10—13 (Fig. 7) may produce a modification of the slope of the magnetic field within the betatron stable orbit region and hence a modification of the average value of $n$. Such a modification may be desirable, for example, to arrange for the average value of $n$ to be as near as possible to 0.25 during the application of the $n$ bump whereby N in Equation 10 is quite large. This enables longer "match time," i. e. time during which injection may be successfully accomplished without undamping of the electron trajectories.

While the above described means for producing an azimuthal $n$ bump facilitates very successful injection of electrons into betatron accelerator apparatus, it may be desirable in some instances to provide means for assuring that $n(\theta)$ remains azimuthally uniform after the $n$ bump is removed during the injection pulse to prevent undamping due to arbitrary azimuthal inhomogeneities. Advantageous means for accomplishing this purpose is illustrated in Figs. 11 and 12 wherein elements similar to those shown and described hereinbefore are identified by like numerals. As will be observed from Fig. 11, a plurality of conductor groups 64—71 are supported by coil forms 14' and 15' adjacent equilibrium orbit O. Each of the conductor groups 64—71 comprises conductors similar to those described hereinbefore in connection with Figs. 1, 1a and 2. In Fig. 12 suitable circuit connections to arrange for the proper energization of conductor groups 64—71 are schematically shown. For the sake of simplicity, conductor groups 64—71 are illustrated in Fig. 12 as circular but it will be understood that the configuration thereof is similar to the groups of conductors 24—27 and 28—31 shown in Figs. 1 and 2 with the exception that the angular extent of each of the groups 64—71 is approximately $\pi/2$. As exemplified, the parallel combination of conductor groups 64 and 68 and the parallel combination of conductor groups 66 and 70 are connected in series with an R. F. choke 72, a resistor 73 and the secondary winding 74 of a transformer 75. The primary winding 76 of transformer 75 is energized from the series circuit of betatron windings 10—13 through a step-down transformer 77, a reversing switch 78 and a variable output transformer 79. In a similar maner, the parallel combination of conductor groups 65 and 69 and the parallel combination of conductor groups 67 and 71 are connected in series circuit a resistor 81 and the secondary winding 82 of a transformer 83. The primary winding 84 of transformer 83 is also energized from the series circuit of betatron windings 10—13 through a step-down transformer 85, a reversing switch 86 and a variable output transformer 87. As will now appear, the energization of conductor groups 64—71 from the time-varying voltage appearing across betatron windings 10—13 provides advantageous means for assuring that $n(\theta)$ remains uniform or that $n$ does not vary with respect to azimuth after an azimuthal $n$ bump has been applied and removed. Reversing switches 78 and 86 permit the reversal of the current through the various conductor groups in order to correct for either sign of azimuthal inhomogeneity while variable output transformers 79 and 87 permit proper adjustment of the magnitude of the current flowing in the various conductor groups. Resistors 73 and 81 have a value which is large with respect to the inductance of the various conductor groups and the respective secondary windings of the transformers in circuit therewith in order that substantially in-phase current may be caused to flow through the various conductor groups. With this circuit arrangement, the desired $n$ bump is provided by connecting the output of power amplifier 56 across the parallel combination of conductor groups 66 and 70 as shown. R. F. choke 72 confines the damping pulse from power amplifier 56 to the parallel combination of conductor groups 66 and 70.

Even though the above described conductor group configurations are preferred because they permit free access to the orbital region and also facilitate the minimizing of return lead inductance, many other conductor configurations may be employed to obtain highly efficient injection according to the invention. Some of these alternative configurations which may be used for vertical injection are shown in Figs. 13–17, each view being taken in the direction opposite to particle acceleration and in the half orbital turn immediately following the electron gun. In each case the conductor position with respect to equilibrium orbit O and the required current flow therein is illustrated in conventional schematic fashion. With each of these configurations, the desired azimuthal $n$ bump may be secured in accordance with the above described principles of the invention. Also, the desired azimuthal $n$ damping bump may be obtained in each case by rotating the particular conductor configuration 90° about orbit O and reversing the directions of current flow. By the same token, the desired azimuthal $n$ bump may be obtained by means of electric field producing plates positioned with respect to equilibrium orbit O and having the polarities indicated in Figs. 18–20. In view of the foregoing discussion, suitable circuitry for securing the exemplified plate potentials will be evident to those skilled in the art. Furthermore, adequate means for supporting the conductor configurations shown in Figs. 13–17, as well as the electric field producing plates shown in Figs. 18–20, will be apparent to those skilled in the art from the foregoing disclosure.

While the invention has been described with particular reference to non-ferromagnetic betatron accelerator apparatus, it may be utilized with similar efficacy in other forms of accelerator apparatus wherein particles undergoing acceleration are retained within a stable path by the provision of a time-varying magnetic field. For example, as shown in Figs. 21 and 22, conductor configurations similar to those described hereinbefore may be employed in connection with feromagnetic betatron accelerator apparatus to obtain efficient injection of electrons for acceleration thereby. As illustrated, this apparatus generally comprises a laminated iron core 100, laminated pole pieces, 101 and 102, laminated centerpiece members 103 and 104 and dielectric spacer members 105. Supported between pole pieces 101 and 102 is an evacuated toroidal envelope 106 having an electron gun 107 sealed therewithin through a side arm 108. Energizing windings 109 and 110, when energized from a suitable source of time-varying voltage (not shown), produce a time-varying magnetic flux which links an equilibrium orbit P within envelope 106 and a time-varying magnetic field which traverses the orbital region. Assuming that the time-varying magnetic flux and field are so arranged by adjusting the parameters of the magnetic circuit that the requirements of Equations 1 and 2 are satisfied, electrons may be accelerated along equilibrium orbit P. To assure successful injection of the electrons from the electron gun 107, an azimuthal $n$ bump may be provided in accordance with the hereinbefore discussed principles of the invention by conductors supported in dielectric blocks 115—117 attached to the exterior of envelope 106 by a suitable adhesive. It will be understood that any of the conductor configurations discussed hereinbefore may thus be employed in connection with iron core betatron accelerator apparatus providing they are also energized in accordance with the principles of the invention. In this connection, it will be recalled that, for radial injection as shown in Figs. 13 and 14, Equation 4 must be employed to determine the angular velocity of the radial oscillations and, therefore, that $n$ should be arranged to be near 0.75, rather than 0.25. Furthermore, the $n$ damping bump must be such that the slope of the curve of the vertical component $H_z$ with respect to radial or $r$ position is altered to cause the net radial restoring force to reduce the amplitude of the radial oscillations.

Further examples of accelerator apparatus with which the present invention may find suitable application are synchrotron apparatus utilizing betatron start such as is disclosed in U. S. Patent 2,485,409, dated October 18, 1949, and assigned to the assignee of the present invention; and proton synchrotron apparatus such as is disclosed in an article appearing in the Review of Scientific Instruments, volume 21, No. 1 (January 1950), and entitled "Design study for a three-bev proton accelerator."

While my invention has been described by reference to particular embodiments thereof, other methods, means and systems which may be utilized with alternative constructions will readily occur to those skilled in the art. I, therefore, aim in the appended claims to cover all such equivalent aspects of my invention as may be within the true spirit and scope of the foregoing description.

What I claim to be new and desire to secure by Letters Patent of the United States is:

1. Apparatus for accelerating charged particles comprising means providing a chamber within which charged particles may be accelerated along an orbital region enclosing an equilibrium orbit, injector structure positioned at a given azimuth within said orbital region for projecting charged particles therealong, a set of windings within said chamber for accelerating said particles along said orbital region including an outer pair of windings axially spaced on opposite sides of a plane in which said equilibrium orbit lies and an inner pair of windings axially spaced on opposite sides of said plane, the space enclosed by said windings being substantially free of ferromagnetic material, means for energizing said set of windings including a source of time-varying voltage connected thereto, said windings being spatially interrelated such that energization thereof by said source of time-varying voltage produces coincidentally both a time-varying magnetic flux which links said equilibrium orbit to accelerate said particles and a time-varying magnetic guide field which traverses said orbital region to maintain said particles therewithin during acceleration, said time-varying magnetic guide field having a gradient which is essentially azimuthally constant, field producing means having a limited azimuthal extent and being located adjacent said orbital region at a predetermined azimuthal position with respect to said given azimuth of said injector structure, and means for energizing said field producing means for a predetermined time interval during at least a portion of the time of injection of said particles to vary said gradient with respect to azimuth.

2. Apparatus for accelerating charged particles comprising means providing a chamber within which charged particles may be accelerated along an orbital region enclosing an equilibrium orbit, injector structure positioned at a given azimuth within said orbital region for projecting charged particles therealong, a set of windings within said chamber for accelerating said particles along said orbital region including an outer pair of windings axially spaced on opposite sides of a plane in which said equilibrium orbit lies and an inner pair of windings axially spaced on opposite sides of said plane, the space enclosed by said windings being substantially free of ferromagnetic material, means for energizing said set of windings including a source of time-varying voltage connected thereto, said windings being spatially interrelated such that energization thereof by said source of time-varying voltage produces coincidentally both a time-varying magnetic flux which links said equilibrium orbit to accelerate said particles and a time-varying magnetic guide field which traverses said orbital region to maintain said particles therewithin during acceleration, said time-varying magnetic guide field having a gradient which is essentially azimuthally constant, field producing means including a group of conductors having a limited azimuthal extent and being located adjacent said orbital region at a predetermined azimuthal position with respect to said azimuth of said injector structure, and means for energizing said group of conductors for a predetermined time interval during at least a portion of the time of injection of said particles to vary said gradient with respect to azimuth.

3. Apparatus for accelerating charged particles comprising means providing a chamber within which charged particles may be accelerated along an orbital region enclosing an equilibrium orbit, injector structure positioned at a given azimuth within said orbital region for projecting charged particles therealong, a set of windings within said chamber for accelerating said particles along said orbital region including an outer pair of windings axially spaced on opposite sides of a plane in which said equilibrium orbit lies and an inner pair of windings axially spaced on opposite sides of said plane, the space enclosed by said windings being substantially free of ferromagnetic material, means for energizing said set of windings including a source of time-varying voltage connected thereto, said windings being spatially interrelated such that energization thereof by said source of time-varying voltage produces coincidentally both a time-varying magnetic flux which links said equilibrium orbit to accelerate said particles and a time-varying magnetic guide field which traverses said orbital region to maintain said particles therewithin during acceleration, said time-varying magnetic guide field having a gradient which is essentially azimuthally constant, field producing means including at least one group of conductors having a limited azimuthal extent and being located adjacent said orbital region at a predetermined azimuthal position for varying said gradient of said magnetic field with respect to azimuth, and means for energizing said at least one group of conductors for a predetermined time interval during at least a portion of the time of injection of said particles to vary said gradient with respect to azimuth during the energization of said conductors.

4. Apparatus for accelerating charged particles within an orbital region comprising magnetic field producing windings adjacent said orbital region capable of being energized by a source of time-varying voltage to provide a time-varying magnetic field which traverses said orbital region and satisfies the relationship $$H_z = H_0 \left(\frac{r}{r_0}\right)^{-n}$$

where $H_0$ is the magnetic field intensity at a predetermined equilibrium orbit within said orbital region, $H_z$ is a component of the magnetic field intensity in a direction perpendicular to the tangent and the radius $r_0$ of the equilibrium orbit when taken at a position under consideration, $r$ is the radius of such a position and $n$ is an exponent serving as a measure of the gradient of the time-varying magnetic field, means varying $n$ as a function of azimuthal position $\theta$ during at least a portion of but not after the termination of the time interval of injection of charged particles into said apparatus, said means comprising an additional winding assembly, including at least one winding adjacent to said equilibrium orbit and extending on both sides of said orbit, the windings being such that the currents throughout said additional winding assembly provide substantially zero field at the orbit.

5. Apparatus for accelerating charged particles defined by claim 4 having field producing means including four electrically separate groups of conductors located adjacent to said orbital region and being connected to a source of time-varying voltage for assuring that the gradient of the said time-varying magnetic guide field remains essentially azimuthally constant after the application of predetermined azimuthal inhomogeneities provided by said additional winding assembly, and means for supplying a current pulse to at least one of said groups of conductors during each cycle of said time-varying voltage.

6. Apparatus for accelerating charged particles defined by claim 4 including field producing means having four electrically separate groups of conductors located adjacent to said orbital region and being energized from a source of time-varying voltage for producing a supplementary time-varying magnetic field traversing said circular region, and means for supplying a current pulse to at least one of said groups of conductors during each cycle of said source of time-varying voltage.

7. Apparatus for accelerating charged particles defined by claim 4 including field producing means having four electrically separate groups of conductors located adjacent said orbital region respectively within each of its four quadrants and being energized from a source of time-varying voltage for producing a supplementary time-varying magnetic field traversing said orbital region, an injector structure oriented at a given azimuth, said azimuth being such that it bisects two opposed quadrants within which said groups of conductors are located and means for supplying a current pulse to at least one of the groups of conductors within the quadrants not bisected by said given azimuth.

8. Apparatus for accelerating charged particles defined by claim 7 wherein said current pulse is supplied to the group of conductors located in the direction of particle acceleration within the quadrant following the one of said bisected quadrants which is nearest said injector structure.

9. Apparatus for accelerating charged particles defined by claim 4 including field producing means having four electrically separate groups of conductors located adjacent said orbital region and being energized from a source of time-varying voltage for assuring that the gradient of said time-varying magnetic field remains essentially azimuthally constant after the application of predetermined azimuthal inhomogeneities by said additional winding assembly, and including means for supplying a current pulse to at least one of said groups of conductors during each cycle of said time-varying voltage.

References Cited in the file of this patent

UNITED STATES PATENTS

| | | |
|---|---|---|
| 2,193,602 | Penney | Mar. 12, 1940 |
| 2,394,070 | Kerst | Feb. 5, 1946 |
| 2,394,072 | Westendorp | Feb. 5, 1946 |
| 2,465,786 | Blewett | Mar. 29, 1949 |
| 2,572,414 | Wideroe | Oct. 23, 1951 |
| 2,572,551 | Wideroe | Oct. 23, 1951 |
| 2,586,494 | Wideroe | Feb. 19, 1952 |
| 2,593,845 | Casimir | Apr. 22, 1952 |